United States Patent
Böhm et al.

(10) Patent No.: US 6,942,287 B2
(45) Date of Patent: Sep. 13, 2005

(54) SLIDING-TILT ROOF MODULE AND COVER FOR A VEHICLE ROOF

(75) Inventors: Horst Böhm, Frankfurt am Main (DE); Rainer Grimm, Frankfurt am Main (DE)

(73) Assignee: ArvinMeritor GmbH (DE)

( * ) Notice: Subject to any disclaimer, the term of this patent is extended or adjusted under 35 U.S.C. 154(b) by 26 days.

(21) Appl. No.: 10/401,277

(22) Filed: Mar. 27, 2003

(65) Prior Publication Data

US 2003/0214158 A1 Nov. 20, 2003

(30) Foreign Application Priority Data

Mar. 27, 2002 (DE) .......................................... 102 13 994

(51) Int. Cl.⁷ ............................................... B60J 7/02
(52) U.S. Cl. ........................... 296/216.09; 296/216.05; 296/216.08; 296/223
(58) Field of Search ..................... 296/216.04–216.09, 296/221–223

(56) References Cited

U.S. PATENT DOCUMENTS

| | | | | |
|---|---|---|---|---|
| 6,151,834 A | * | 11/2000 | Oami et al. ................... | 49/402 |
| 6,283,540 B1 | * | 9/2001 | Siebelink et al. ........... | 296/191 |
| 6,283,542 B1 | * | 9/2001 | Patz ............................ | 296/211 |
| 6,318,798 B1 | * | 11/2001 | Bergmiller ................... | 296/211 |
| 6,494,529 B1 | * | 12/2002 | Manders ...................... | 296/222 |
| 2002/0125743 A1 | * | 9/2002 | Bohm et al. ............ | 296/216.04 |

FOREIGN PATENT DOCUMENTS

| | | |
|---|---|---|
| DE | 38 25 838 | 10/1990 |
| DE | 43 08 221 A1 | 9/1994 |
| DE | 43 21 915 | 9/1995 |
| DE | 198 08 113 A1 | 9/1998 |
| DE | 199 21 181 A1 | 11/1999 |
| DE | 199 11 811 C1 | 6/2000 |
| DE | 199 06 516 | 8/2000 |
| DE | 199 18 150 C1 | 10/2000 |
| DE | 100 36 630 C1 | 1/2002 |
| DE | 100 36 816 A1 | 2/2002 |
| EP | 0 551 841 | 7/1994 |
| EP | 0806539 A1 | 11/1997 |
| EP | 1070616 | * 1/2001 |

OTHER PUBLICATIONS

European Search Report dated Feb. 2, 2004.
Austrian Search Report dated Apr. 15, 2002.

* cited by examiner

Primary Examiner—Dennis H. Pedder
(74) Attorney, Agent, or Firm—Carlson, Gaskey & Olds

(57) ABSTRACT

A displaceable cover of a sliding-tilt roof module closes a vehicle roof opening. The cover includes a large-surface panel and longitudinal slide guide parts for shifting the cover. The slide guide parts are embedded in a foamed backing applied on a rear side of the panel. Two slide guide parts and two transverse braces form a frame that stabilizes the cover. The slide guide parts can also be secured to the panel by an additional securing feature. The guide has a first section embedded in the foamed backing and a second section projecting from the foamed backing. The slide guide parts are received in sliders to allow longitudinal movement of the panel.

13 Claims, 5 Drawing Sheets

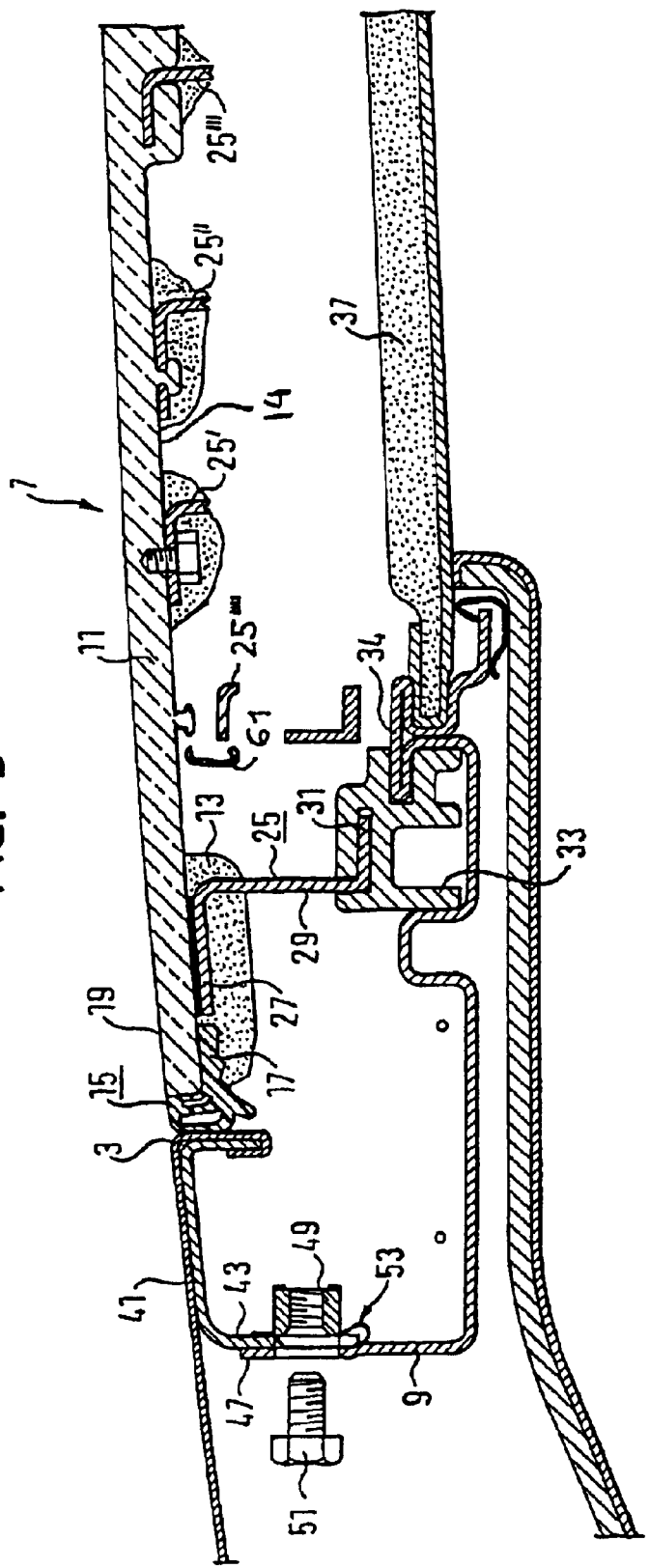

SLIDING-TILT ROOF MODULE AND COVER FOR A VEHICLE ROOF

This application claims priority to German Patent Applicant Number DE 102 13 994.6 filed on Mar. 27, 2002.

BACKGROUND OF THE INVENTION

The invention relates generally to a sliding-tilt roof module for a vehicle roof having guides attached to a rear side of a slidable panel by a foamed backing and a cover panel for use in such a module.

Covers for a sliding-tilt roof module of a vehicle include a large-surface panel with a foamed backing applied on a rear side of the panel. The module further includes a guide for sliding the cover. A reinforcement element on the rear side of the panel increases the stability of the module. The guide is secured to the reinforcement elements by screws. The sliding-tilt roof modules also commonly include a guide frame immovably fastened to the vehicle roof and a reinforcement frame incorporated in the vehicle roof.

A prior art cover is disclosed in German Patent No. 43 21 915. This prior art cover includes a cover carrier on the underside of the panel adjacent to the foamed backing. A longitudinal guide in the form of a slot is fastened to the cover carrier to allow for shifting. Another prior art cover is disclosed in European Patent Application 0 551 841. This prior art cover discloses a cover for closing a vehicle roof opening. A guide is fastened to the rear side of the cover by glue.

SUMMARY OF THE INVENTION

A displaceable cover for closing a vehicle roof opening includes a large-surface panel and a guide for shifting the cover. The guide is embedded in a foamed backing applied on a rear side of the panel. A first section of the guide is embedded in the foamed backing and a second section of the guide projects out of the foamed backing. The guide connected to the panel provides reinforcement and increases the stability of the cover.

Two longitudinal guides are positioned at the edges of the panel. The two longitudinal guides and two transverse braces form a frame that surrounds the edge of the cover. The guides and the braces can be secured to each other to form a continuous frame or an interrupted frame.

Alternately, the guide is directly attached to the rear side of the panel prior to embedding the guide in the foamed backing. The guide can be attached by glue, thermo-rivets, screws, a clip-on connection, or by a detent connection.

An adjustment mechanism including a nut-and bolt connection is employed to adjust the sliding tilt roof module. A clamp is non-rotatably fastened to an edge of either a guide frame or a reinforcement frame. The clamp receives the nut or the bolt which are non-rotatably fitted to the guide frame or the reinforcement frame. Preferably, the edge has a step (e.g. a protrusion or a recess) which prevents the clamp from rotating. The clamp also includes clamping fingers which rest against the end of the edge of the guide or the reinforcement frame to also prevent rotating. The bolt is received in the nut to allow for adjustment of the sliding-tilt roof module.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 5 shows a cross-sectional view through the sliding-tilt roof module in the region of a longitudinal guide according to a second example of the invention.

DETAILED DESCRIPTION OF THE PREFERRED EMBODIMENT

Figure 1:
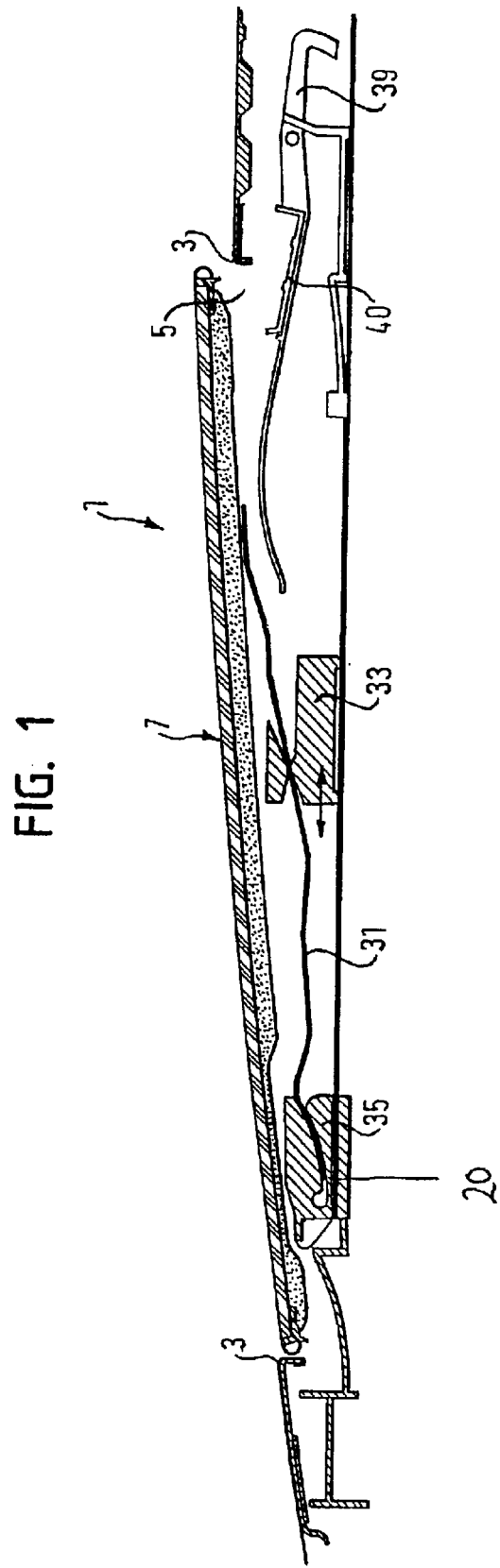
FIG. 1 shows a longitudinal sectional view through the sliding-tilt roof module of the present invention.

FIG. 1 illustrates a longitudinal section of the sliding-tilt roof module 1 of the present invention. The sliding-tilt roof module 1 includes a displaceable cover 7 received in a roof opening 5 of a vehicle roof defined by an edge 3. The sliding-tilt roof module 1 further includes an adjustment mechanism and a guide frame 9 (shown in FIG. 2) fastened to the roof.

Figure 2:
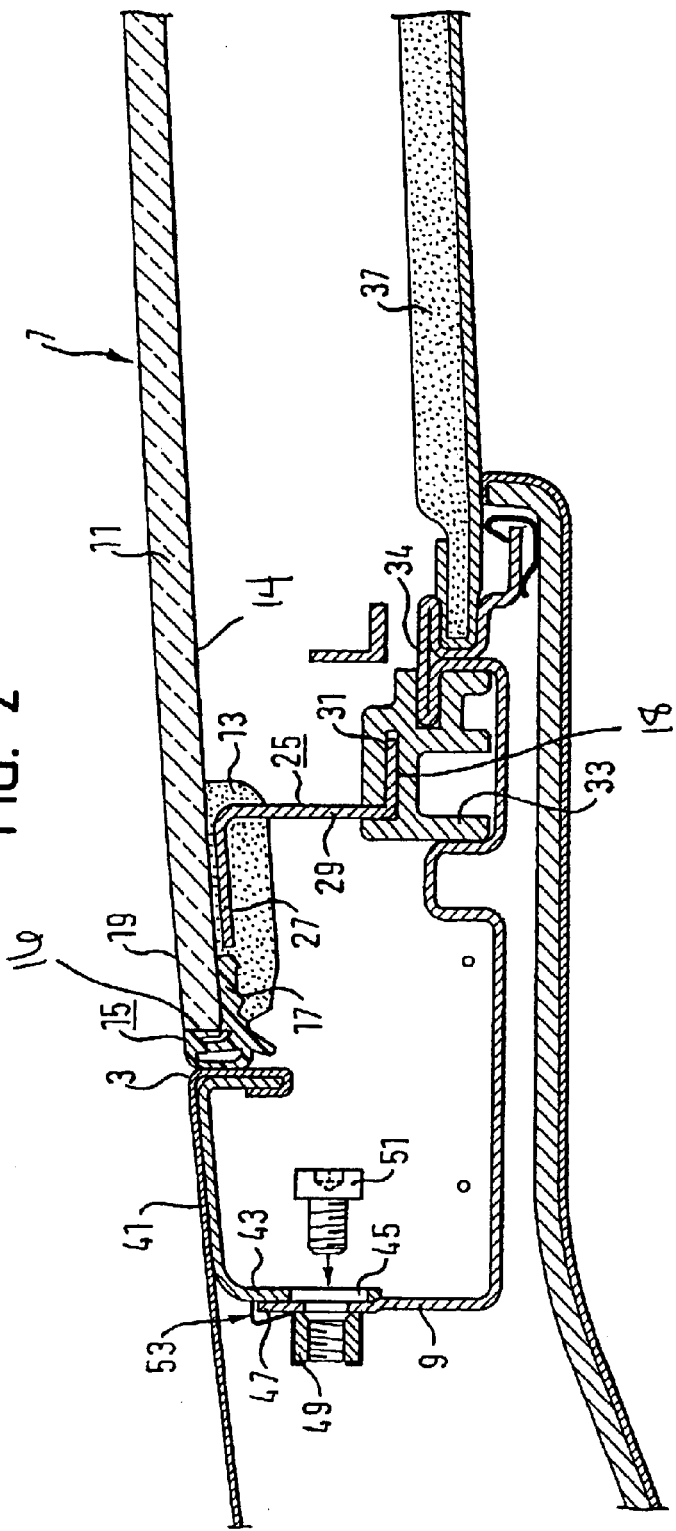
FIG. 2 shows a cross-sectional view through the sliding-tilt roof module in the region of a longitudinal guide.

As shown in FIG. 2, the cover 7 includes a large-surface panel 11 that forms the vehicle's outer skin when the cover 7 is closed. The panel 11 can be made of glass, plastic or sheet metal. Panel 11 has a foamed backing 13 on its rear side 14. A cover seal 15 having a flange-like section 17 extends along an edge 16 of the panel 11. The flange-like section 17 lies against the rear side 14 of the panel 11 and is connected to the panel 11 by the foamed backing 13.

Figure 3:
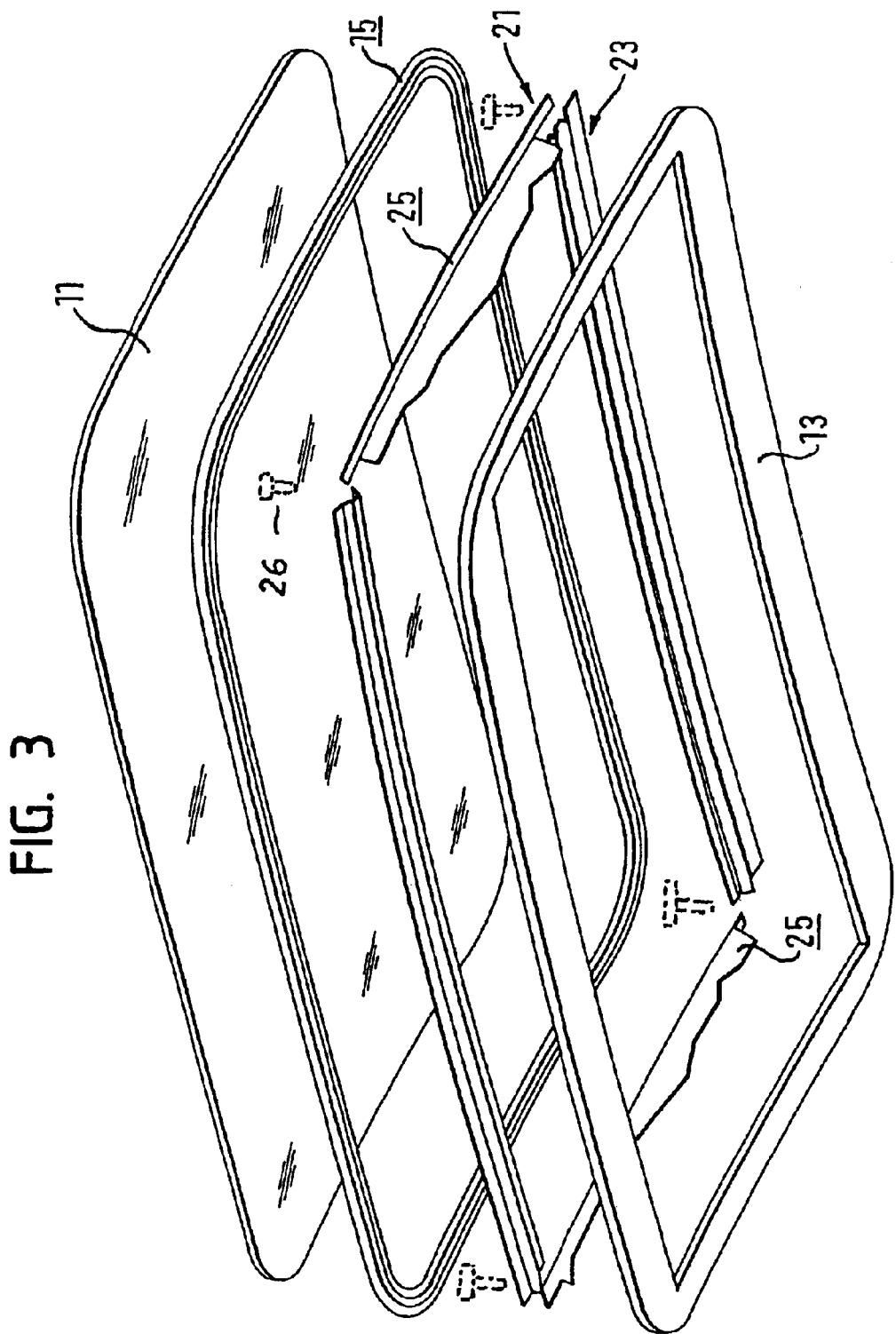
FIG. 3 shows an exploded view of the cover.

As shown in FIG. 3, integrated reinforcements extend along an edge 19 of the cover 7 to form an interrupted frame 21 that stabilizes the cover 7. The interrupted frame 21 essentially consists of four parts, namely two transverse braces 23 and two longitudinal guides in the form of slide guide parts 25. The transverse braces 23 extend transversely to the longitudinal direction of the vehicle on the front and rear edges 19 of the cover 7, and the slide guide pans 25 extend on opposing lateral edges 19 of the cover 7 in the longitudinal direction of the vehicle. If the cover 7 is small, only the two slide guide parts 25 are employed and the transverse braces can be omitted. Additionally, the guides do not have to be a longitudinal guide. The cover 7 can be configured to be tiltable only.

The transverse braces 23 can be fastened to the slide guide parts 25 to form a circumferentially closed frame 21. Bolts 26 (shown in dotted lines) affix the ends of the transverse braces 23 and the slide guide parts 25 to each other to form the circumferentially closed frame 21.

The slide guide parts 25 are stamped and bent, preferably without any cut-outs or the like which may weaken the slide guide parts 25. As shown in Figure 2, the one-piece slide guide part 25 has an inverted "Z" shaped cross-section. An upper, horizontal flange 27 and part of a vertical connecting web 29 are embedded in the foamed backing 13. The slide guide part 25 is embedded in the foamed backing 13 by positioning the slide guide part 25 in a roaming mold and then applying foamed backing 13. This embedded section will be refined to as the first section. The remainder of the connecting web 29, which projects out of the roamed backing 13, and a lower flange 31 will be referred to as the second section. The first and second sections are formed in one piece with each other. The slide guide part 25 is integrated with the cover 7 and connected to the panel 11 by the foamed backing 13 and no additional screw connections are necessary.

Returning to FIGS. 1 and 2, the lower flange 31 of the slide guide part 25 is received in a slot-shaped mount 18 of a slider 33, with the slider 33 forming a shifting part. The slider 33 is received in a guide 34 of the guide frame 9 so as to be movable in the longitudinal direction. The two parallel slide guide parts 25, to be more precise their second sections, form two parallel longitudinal guides of the cover 7. The flange 31 forms a slide guide race, the course of which is clearly to be seen in FIG. 1. As the flange 31 defines an inclined path, the slider 33 can be shifted along the guide 34 in the longitudinal direction of the vehicle to vertically move the rear end of the cover 7. The slider 33 moves to the front to lift and cover 7 at its rear end, and the slider 33 moves towards the rear to lower the cover 7 at its roar end.

Alternately, the slider 33 is embedded in the foamed backing 13 and/or is fastened to the rear side 14 of the panel 7 to form the longitudinal guide. However, it is preferred that the elongate slide guide part 25 is rigidly connected to the cover 7, so that it can acts as a reinforcement.

The front end of flange 31 is received in a second slider 35 which is employed to open and close the cover 7. The second slider 35 is driven by a separate drive mechanism. When the drive mechanism is actuated, the second slider 35 moves the cover 7.

As shown in FIG. 3, the sliding-tilt roof module 1 further includes a sun shade 37 (Figure 2) and a latching system 39 far securing the cover 7. An integrated tilting lever is employed to raise a water gutter 40. Other components of the shifting mechanism, for instance, for horizontally moving the cover 7, are well known in the art and are not explicitly explained here.

As the slide guide parts 25 are rigidly coupled with the panel 11, an adjustment mechanism of the guide frame 9 adjusts the sliding-tilt roof module 1 upon installation. The guide frame 9 is secured to a surrounding reinforcement frame 43 on the rear side of the roofing sheet metal 41. The reinforcement frame 43 has an extra large or elongated hole 45 that aligns with a rectangular nut 49 fastened to the edge 47 of the guide frame 9. A bolt 51 passes through the hole 45 in the reinforcement frame 43 and the nut 49. The diameter of the hole 45 is larger than the outer diameter of the threads of the bolt 51 by more than 1 mm.

Figure 4:
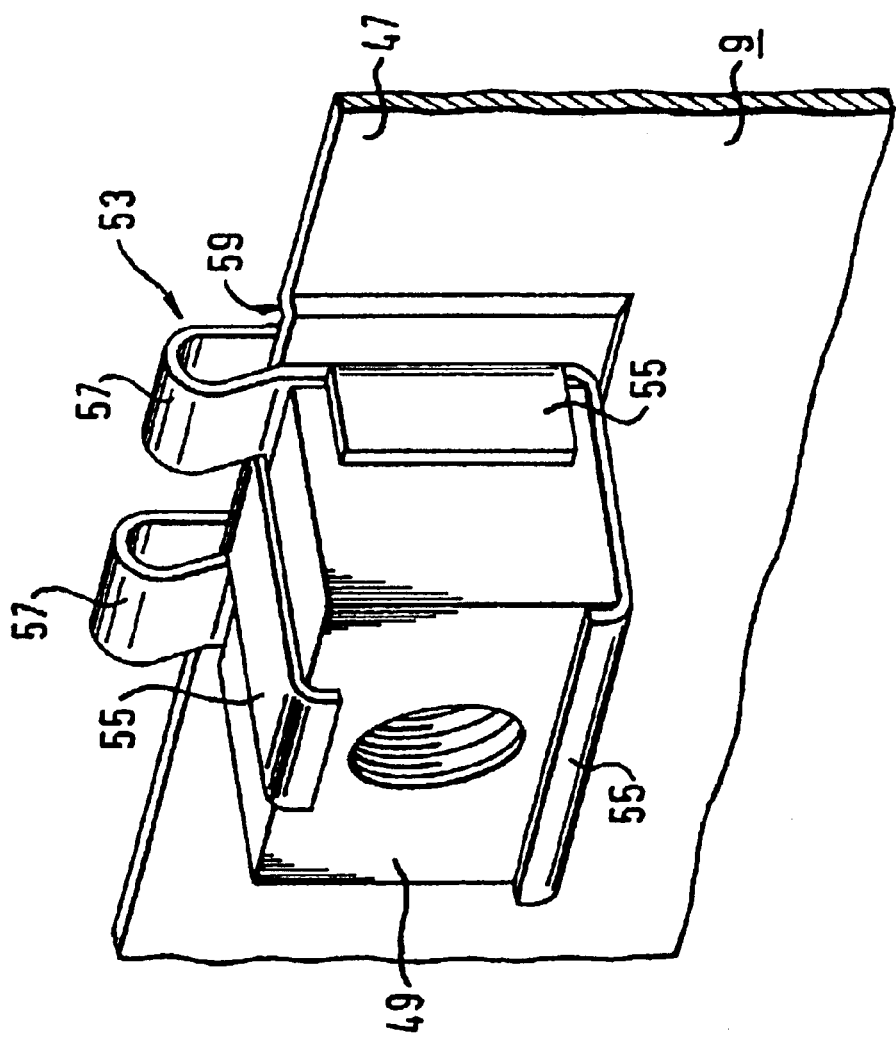
FIG. 4 shows an enlarged perspective view of the adjustment mechanism employed in the sliding-tilt roof module.

As shown in FIG. 4, the adjustment mechanism includes e clamp 53 having numerous holding arms 55 which grasp the nut 49 with an interlocking fit. The clamp 53 further includes two bent-off clamping fingers 57 that attach the clamp 53 to the edge 47 of the guide frame 9 to a non-rotatably couple the nut 49 to the guide frame 9. The guide frame 9 further includes a step or recess 59. When the clamp 53 is positioned on the edge 47, the step or recess 59 extends along the lateral edge of the clamping fingers 57, preventing the nut 49 and the clamp 53 from turning as the bolt 51 is screwed into the nut 49. The nut 49 can also be prevented from turning by slipping the clamp 53 on the edge 47 until the clamping fingers 57 rest on the upper edge termination of the guide frame 9.

FIG. 5 illustrates alternate fastenings of the slide guide part 25 to the panel 11. The slide guide parts 25 can be directly fastened to the panel 11 of the cover 7 and then embedded in the foamed backing 13 to form a prefabricated unit. The slide guide part 25 can be directly glued to the rear side 14 of panel 11 and then partially embedded in the foamed backing 13.

Alternately, the slide guide part 25' is secured to the panel 11 by a threaded fastener and then partially embedded in the foamed backing 13. A thermo-riveting connection (see slide guide part 25") can also be used. Plastic pegs on the rear side 16 of the panel 11 are received in holes in the slide guide part 25". The pegs are then heated, melting the pegs and securing the slide guide part 25" to the panel 11. The foamed backing 13 can also be applied to a slide guide part 25''' already embedded in the panel 11. For example, if the cover 7 is made of plastic, the panel 11 can be injection-molded. The slide guide part 25''' is partially covered by the injection-molded material and embedded into the panel 11 during manufacture.

A latching connection or other conventional connections can be employed to directly fasten the slide guide part 25, or more generally the guide, to the panel 11, such as by employing a clip 61 or by employing a detent connection. It is to be understood that other types of connections are also possible, and one skilled in the art would know how to secure the slide guide part 25 to the cover 7. The adjustment mechanism shown can also be employed for adjusting other parts of a vehicle roof. For example, the adjustment mechanism can be used to adjust an entire roof module which has to be leveled with the adjoining car body portions.

Alternately, the clamp 53 can be slipped on the edge of the reinforcement frame 43 of the roof rather than on the guide frame 9. This makes it possible to screw in the bolt 51 from outside, where the bolt head is more easily accessible.

The present invention simplifies construction of roof, simplifying installation and lowering costs. Additionally, as the slide guide parts 25 are secured to the cover 7 by the foamed backing 13, and not by the reinforcement elements of the prior art, screws do not have to be employed, simplifying installation and reducing the number of installation steps. The slide guide parts 25 act as longitudinal guides and provide reinforcement, simplifying the structure. The transverse braces 23 and the slide guide parts 25 are completely (or in sections) integrated in the foamed backing 13, allowing the cover 7 to be produced by simple and cost-effective ways.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A displaceable cover for closing a vehicle roof opening comprising:
    a panel having an underside;
    a foamed backing applied on said underside of said panel; and
    a guide for shifting said cover, said guide having a first section embedded in said foamed backing and a second section projecting from said foamed backing, wherein said first section and said second section of said guide are integrated together.

2. The cover according to claim 1, wherein said guide contacts and is connected to said underside of said panel.

3. A displaceable cover for closing a vehicle roof opening comprising:
    a panel having an underside;
    a foamed backing applied on said underside of said panel; and a guide for shifting said cover, said guide having a first section embedded in said foamed backing and a second section projecting from said foamed backing, wherein said guide is connected to said panel by one of a thermal-rivet, a threaded fastener, and a clip.

4. The cover according to claim 1, wherein said guide is a longitudinal guide.

5. The cover according to claim 4, wherein said second section of said longitudinal guide is a slide guide part having a race that is in engagement with a shifting part that can be moved along said race.

6. The cover according to claim 4, wherein said second section of said longitudinal guide is a shifting part which engages in a slide guide part that has a race and said shifting part can be moved along said race relative to said slide guide part.

7. The cover according to claim 4, wherein the cover has two opposing edges, and each of said opposing edges is provided with a said guide to reinforce said cover.

8. The cover according to claim 4, wherein said guide is part of a frame integrated in said cover, and said guide extends along an edge of the cover.

9. The cover according to claim 8, wherein there are two of said guides and said frame further includes two transverse braces which extend transversely to said guides along said edge of said cover.

10. The cover according to claim 9, wherein said frame is circumferentially closed.

11. A displaceable cover for closing a vehicle roof opening comprising:
    a panel having an underside;
    a foamed backing applied on said underside of said panel; and
    a guide for shifting said cover, said guide having a first section embedded in said foamed backing and a second section projecting from said foamed backing, wherein said guide is spaced apart from the panel and is coupled to said panel only by said foamed backing.

12. A displaceable cover for closing a vehicle roof opening comprising:
    a panel having an underside;
    a foamed backing applied on said underside of said panel; and
    a guide for shifting said cover, said guide having
        a substantially horizontal upper flange embedded in said foamed backing,
        a substantially horizontal lower flange disposed outside of said foamed backing and defining a slide guide race, and
        a web connecting said upper flange and said lower flange and projecting from inside said foamed backing to said lower flange.

13. A displaceable cover for closing a vehicle roof opening comprising:
    a panel having an underside;
    a foamed backing applied on said underside of said panel; and
    a guide for shifting said cover, said guide having a first section embedded in said foamed backing and a second section projecting from said foamed backing, said guide contacting said underside of said panel and being connected to said panel by an adhesive, wherein said adhesive and a portion of said guide contacted by said adhesive is embedded in said foamed backing.

* * * * *